March 7, 1939.  C. GIRL ET AL  2,149,598

ILLUMINATED VEHICLE MIRROR

Filed June 24, 1936  2 Sheets-Sheet 1

INVENTORS.
Christian Girl,
Wayne E. Dunston.
BY
Harness, Dickey Pierce & Hann
ATTORNEYS.

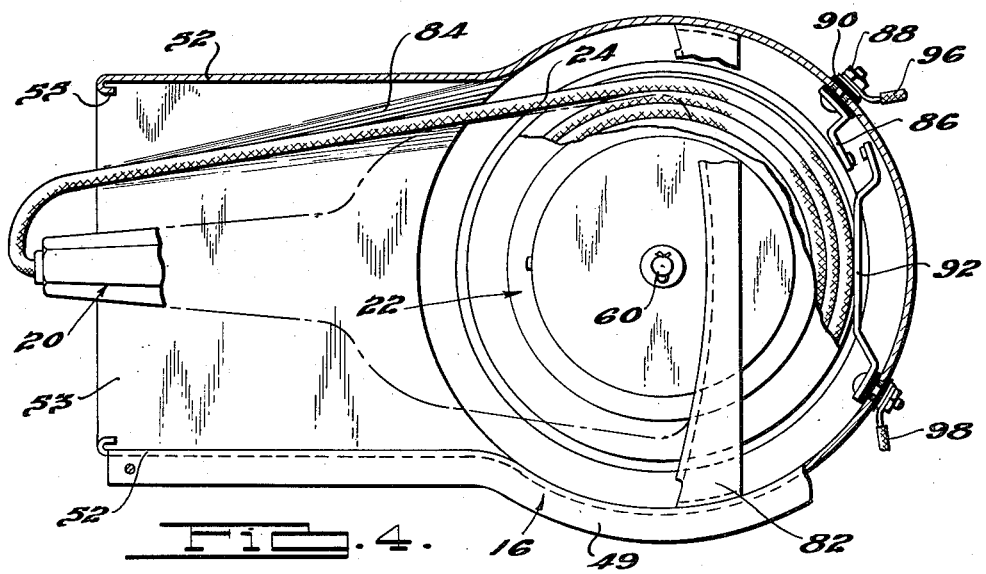
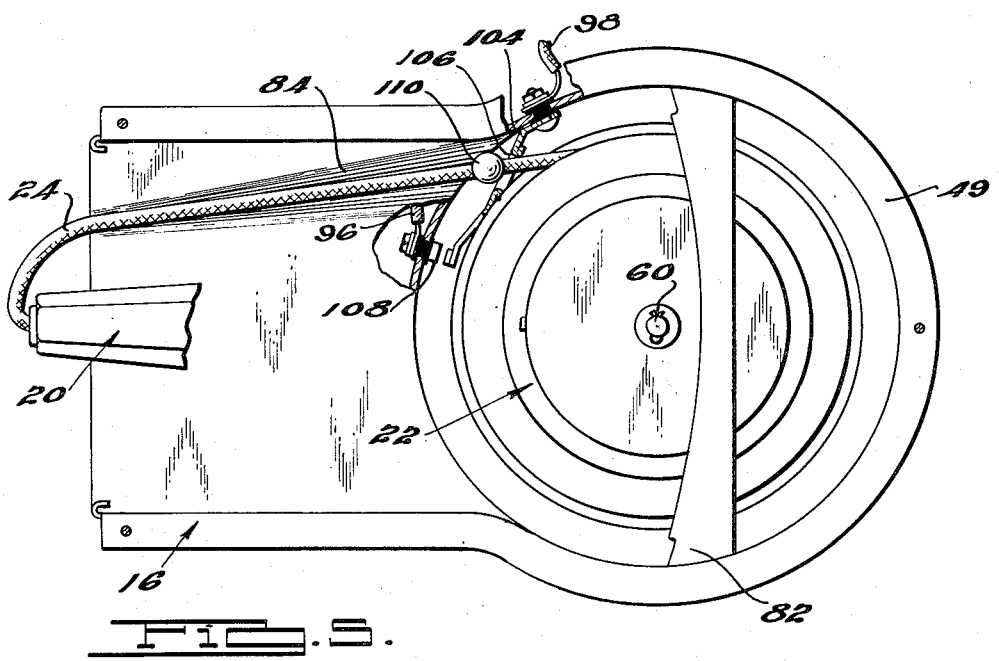

Patented Mar. 7, 1939

2,149,598

UNITED STATES PATENT OFFICE 2,149,598

ILLUMINATED VEHICLE MIRROR

Christian Girl and Wayne E. Dunston, Detroit, Mich., assignors to Kelch Heater Co., Detroit, Mich., a corporation of Michigan Application June 24, 1936, Serial No. 86,949

5 Claims. (Cl. 240—4.2)

This invention relates to accessories for automobiles and in particular relates to illuminated mirrors mounted within automobiles.

Objects of the invention are to provide an illuminated mirror mounted within an automobile so that it may be readily accessible for use and when not in use, is not visible and is protected against damage; to provide an illuminated mirror having an extension lamp cord attached thereto and an automatic switch associated therewith so that when the mirror is removed a distance from its casing, the lamp will automatically light and just before the mirror is replaced within the casing, the lamp will be automatically extinguished; to provide a rewinding drum for the extension cord so mounted within the casing that the plane of winding is substantially in line with the line of movement of the cord; to provide a mounting for an illuminated mirror under the glove box on the instrument panel of an automobile in the form of a casing which supports the mirror in a substantially horizontal but slightly inclined position; and to provide an improved construction relatively inexpensive to manufacture, easy to assemble and rugged in operation.

Other objects of the invention will become apparent from the following specification, the drawings relating thereto and from the claims hereinafter set forth.

In the drawings in which like numerals are used to designate like parts in the several views throughout:

Fig. 4 is a top plan view of the structure shown in Fig. 3 with parts broken away and parts shown in cross-section;

Fig. 5 is a top plan view of a modified form of the invention.

Figure 1:
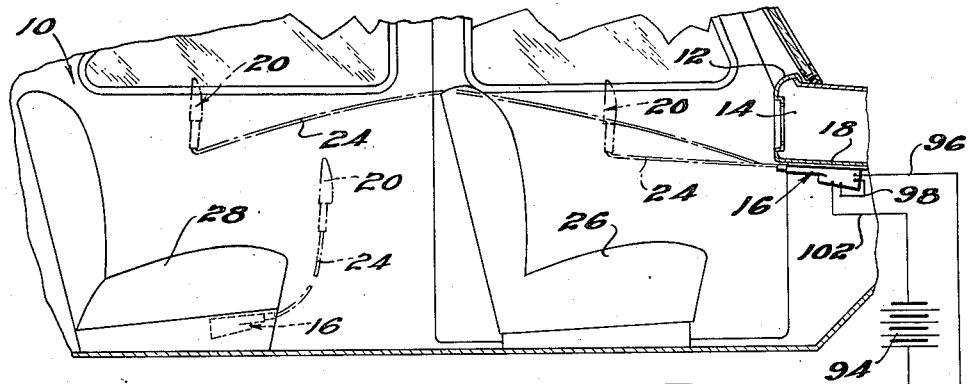
Figure 1 is a fragmentary side view showing the interior of an automobile embodying features of the present invention.

It is recognized that illuminated mirrors are old and that it is old to mount illuminated mirrors with rewinding drums on the front faces of instrument panels of automobiles; but in such constructions the mirror is visible to the occupants of the car and is in such a position that it not only mars the attractiveness of the instrument panel, but is also subject to breakage and damage as it cannot be adequately protected.

In the present invention a casing is provided which is mounted in an out-of-the-way position which is normally invisible to the occupants of the car, and which encloses the illuminable mirror and rewinding drum protecting them from damage. The casing may be mounted in an out-of-the-way, substantially horizontal position opening into the interior of the car in several places, for example, under the instrument panel, or under the rear seat, or in the rear of the front seat, or several casings mounted in several different positions, all within the scope of the present invention. It is preferable to mount the casing under the instrument panel and when so mounted it is still preferable to mount the casing under the glove box of the instrument panel as it is then conveniently accessible to the occupants of the car along with the other accessories usually carried in the glove box.

In the present invention an extension conductor, or cord, is attached to the illuminated mirror so that it can be carried to any part of the car and a rewinding drum is associated with the extension conductor so that when the mirror is replaced within the casing, the extension conductor will be rewound within the casing in an orderly fashion. The drum is mounted for rotation around a vertically inclined axis so that the line of movement of the cord into and out of the casing is in line with the plane of rewinding on the drum so that the cord is disposed on the drum in an orderly fashion.

A switch is also provided within the casing and is associated with the extension cord in such a way that when the mirror is withdrawn from the casing a short distance, the cord is unwound and the switch automatically closes the lamp circuit and the lamp will light, and when the cord is rewound to an extent just before the mirror is re-inserted within the casing, the lamp circuit is broken.

In the present construction in which the mirror is mounted within a casing and is invisible to the occupants of the car, it is particularly desirable that the lamp not light until the mirror is completely removed from the casing and that the light go off before the mirror is re-inserted within the casing as a check against the light being on when the mirror is within the casing, which would cause premature exhaustion of the battery supplying the current for the lamp. The automatic switch and operating mechanism associated therewith are therefore preferably so constructed and arranged that the lamp is completely removed from the casing and extended a slight distance away from the casing before the light goes on, and are so constructed and arranged that the light will go off before the cord is completely rewound within the casing and the mirror reinserted within the casing.

For a better understanding of the invention, reference may be had to the drawing and in Figure 1, the interior of an automobile 10 is shown having an instrument panel 12 in its usual position which has a glove box 14 constructed therewith. A casing 16 is mounted on the under side 18 of the instrument panel, preferably directly under the glove box 14. The casing 16 is adapted to support therein an illuminated mirror 20 and a rewinding reel 22 (Fig. 3) and an extension conductor or cord 24. As shown by the dotted lines in Figure 1, the mirror 20 may be extended to occupants of either the front or rear seats 26 and 28, respectively. Another casing 16 is also shown as mounted under the rear seat 28 and the casings illustrated may be mounted in the positions shown together; or, if desired, only one of the casings may be mounted in the position desired. The operating mechanism and mirror mounting is the same for both casings.

Figure 2:
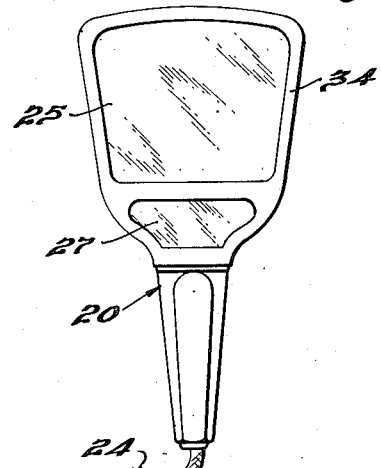
Fig. 2 is a front elevational view of an illuminated mirror according to an embodiment of the present invention.
Figure 3:
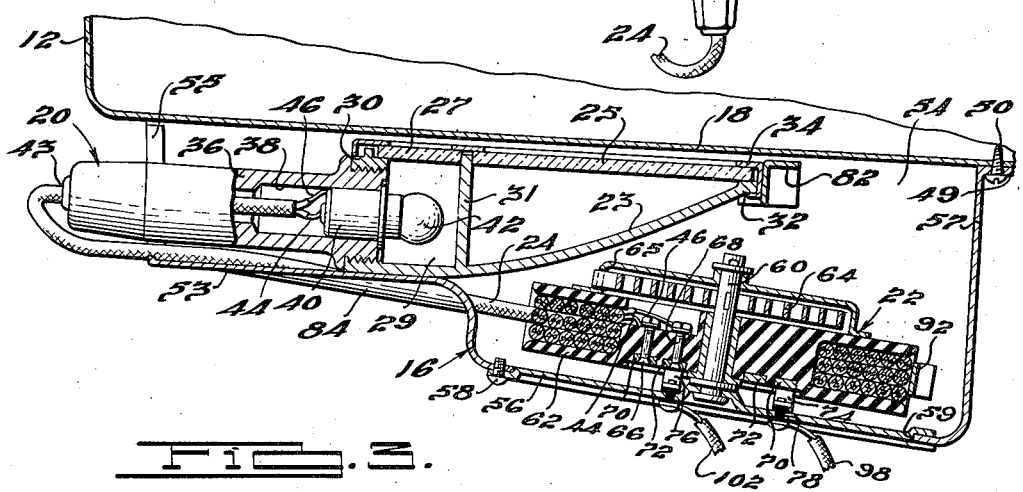
Fig. 3 is a vertical cross-sectional view taken substantially through the longitudinal center of the mirror, reel and casing mounted on the under side of the instrument panel according to one form of the present invention.

Referring to Figs. 2 and 3, the mirror 20 comprises a frame 23 supporting a silvered mirror section 25 and a glass section 27 preferably of light diffusing glass, such as frosted glass. The frame 23 has a cross piece 31 which forms a chamber 29 between the cross piece and the base 30 of the frame; and the rear wall of the frame is curved forwardly from the cross member 31 to the top 32 of the frame. The mirror 25 and the light diffusing glass 27 are held in place on the frame by means of a metal frame strip 34 which engages the edges of the mirror 25 and diffusing glass 27, and the edges of the frame 23.

The base 30 is provided with a threaded opening into which a tubular handle 36 having one end threaded is screwed. The tubular handle 36 is provided with a central longitudinal cylindrical recess 38 which is adapted to receive a base 40 in which a lamp bulb 42 is removably held in the usual manner. When the handle is in its assembled position, as shown in Figure 3, the light bulb 42 is located within the chamber 29 behind the light diffusing glass 27. As the mirror 25 and the light diffusing glass 27 are in substantially the same plane and as light rays from the bulb cannot penetrate behind the mirror 25 because of the member 31, the mirror is shaded from the lamp as the lamp cannot directly shine thereon; and glare will not be evident in the mirror distorting the image of a person using it, while at the same time the features of the person using the mirror will be adequately lighted.

The handle 36 is provided with an opening 43 through its lower end through which the extension cord 24 passes, the extension cord carrying two lead wires 44 and 46, the lead wire 44 being connected to the lamp filament through the base of the lamp bulb and the wire 46 being secured in electrical contact with the metal base 40.

The casing 16 has an outwardly directed flange 49 around its upper edge which engages and is suitably secured to the under side 18 of the instrument panel 12 by means of screws 50 or the like. The casing is provided with substantially straight side portions 52 connected by the substantially straight bottom 53 whose transverse width is slightly greater than that of the mirror and whose depth is also slightly greater than the depth of the mirror. The forward portion of the casing is provided with an opening 55 through which the mirror is withdrawn from the casing. The rear portion 54 of the casing which is adapted to enclose the rewinding means 22 is enlarged, is substantially circular in shape, and is of greater depth than that portion of the casing 52.

An opening 59 is provided in the bottom face of the rear portion 54 substantially circular in shape, and a cover or face plate 56 fits over the opening 59 and is removably secured to the casing 16 by means of screws 58, or the like. The face plate 56 has mounted thereon substantially at its center the reeling mechanism 22 which is adapted to rotate about a fixed pivot post 60 secured to the face plate 56.

The rewinding mechanism comprises a drum 62 revolvably mounted on the pivot post 60 and provided with a spiral spring 64 within the housing 65, one end of the spring being secured to the fixed shaft 60 and the other end of which is secured relative to the drum 62 through the housing 65 which is fixed to the drum so that when the drum is unwound, the spring will be placed under tension and cause a rewinding movement of the drum when the unwinding force is removed. The extension cord 24 is normally wound on the drum; and the lead wires 44 and 46 projecting from the inner end of the extension cord 24 are suitably secured in electrical contact with contact pins 66 and 68 respectively.

The drum 62 is made of insulating material such as hard rubber and is provided with a recess receiving the contact pins 66 and 68 which extend through the drum 62. Annular recesses are provided in the lower face of the drum 62 and are adapted to receive annular metallic contact bars 70 and 72. The lower end of the pin 66 is in electrical contact with the bar 70 and the lower end of the contact pin 68 is in contact with the bar 72.

Metallic spring clips 74 and 76 resiliently and slidably engage rings 70 and 72, respectively, at all times during rotation or while the drum is at rest and are secured to the face plate 56 through openings therein and are separated from electrical contact with the plate 56 by means of insulating bushings 78. The two spring contact elements 74 and 76 are connected to the electric circuit in a manner to be hereinafter described in detail.

The entire casing 16 is mounted under the plate 18 in a substantially horizontal position but is inclined slightly downwardly toward the rear so that when the mirror is placed in position within the casing, it will tend to move toward the rear of the casing and will not slide out through the opening 55. A transverse bar 82 is provided toward the rear of the casing and acts as a support and stop against which the top of the mirror abuts when the mirror is within the casing.

The substantially straight bottom 53 of the casing adjacent the opening acts as a support for the mirror and is provided with a longitudinal gradually deepening groove 84 adjacent one side which receives and guides the extension cord 24 substantially tangential to the winding drum. The closed end wall 57 of the casing 16 has the greatest depth so that when the face plate 56 is in its assembled position, it is inclined downwardly so that the pivot post 60 is in an inclined vertical position, as shown in Figure 3, so that the plane of the drum 62 is substantially parallel to the plane of movement of the extension cord 24 so that upon rewinding of the extension cord, it will be arranged in an orderly fashion in the drum.

An automatic switch is provided within the casing and comprises a rigid contact element 86 secured relative to the casing by means of nut and bolt 88, but insulated therefrom by means of an insulating bushing 90 and a spring contact element 92 which is secured relative to the casing in a manner similar to the element 86.

To provide the electric circuit the element 86 has electrical connection with one end of a battery 94 through lead wire 96, and the spring contact element 92 is in electrical contact with the spring contact element 74 through lead wire 98. The opposite end of the battery is in electrical contact with the spring contact element 76 through lead wire 102.

The switch spring element 92 is normally urged toward the element 86 but, as shown in Figure 4, when the extension cord 24 is wound up on the drum, the cord engages the spring element 92 and separates it from contact with the element 86. When the mirror is removed from the casing and the extension wire is unwound for a short distance, the spring element 92 will be permitted to assume its normal position and close the circuit by contacting the element 86, and the bulb will be lighted. As the extension cord is wound up on the drum, before the mirror is placed into the casing, the extension cord on the drum will again contact the spring element 92, separating it from the element 86 thereby breaking the circuit.

In the modified form of structure shown in Figure 5, the automatic switch is modified in that a spring element 104 is mounted toward the front of the circular portion of the casing 16 and is provided with an opening 106 therethrough, through which the extension cord 24 extends. The switch spring element 104 is normally urged toward a contact terminal 108; but when the extension cord is in its wound up position on the drum, a ball shaped abutment 110 mounted on the extension cord 24 abuts against the edges of the opening 106 of the spring element and separates it from contact with the terminal 108. When the mirror is removed from the casing and the extension cord unwound, the ball 110 moves away from abutting relation with the spring element 104 and the spring element 104 then moves to its normal position and contacts the terminal 108 closing the electric circuit. The ball 110 has a cylindrical opening therethrough which fits around the cord 24 and is in tight engagement with the cord but with effort may be moved along the cord in order to adjust the point at which the automatic switch is opened or closed.

Formal changes may be made in the specific embodiment of the invention described without departing from the spirit and substance of the invention, the scope of which is commensurate with the appended claims.

What is claimed is:

1. An accessory for automobiles comprising a casing located out of normal vision, said casing having an opening therein, an electrically illuminated mirror including a lamp, said mirror including said lamp being located within said casing and removable through said opening, a rewinding drum within said casing having an extension conductor connected to said lamp, and a switch within said casing automatically operable to close the lamp circuit when the mirror is removed a distance from said casing into normal vision.

2. An accessory for automobiles comprising a casing located out of normal vision, said casing being disposed substantially horizontal but slightly downwardly inclined and having an opening therein toward the interior of the automobile, an electrically illuminated mirror including a lamp, said mirror including the lamp being located within said casing and removable through said opening, means within said casing to support said mirror in a substantially horizontal position, a rewinding drum within said casing having an extension conductor connected to said lamp, and a switch within said casing automatically operable to close the lamp circuit when the mirror is removed a distance from said casing into normal vision.

3. An accessory for automobiles comprising a casing located out of normal vision, said casing being disposed substantially horizontally and having an opening therein toward the interior of the automobile, an electrically illuminated mirror including a lamp, said mirror including the lamp being located within said casing and removable through said opening, means within said casing to support said mirror in a substantially horizontal position, a rewinding drum within said casing having an extension conductor connected to said lamp and a switch within said casing having a spring arm engaging said extension conductor when the conductor is in its wound-up position and automatically operable to close the lamp circuit when the conductor is unwound when the mirror is removed a distance from said casing into normal vision.

4. An accessory for automobiles comprising a casing located out of normal vision, said casing being disposed substantially horizontally and having an opening therein toward the interior of the automobile, an electrically illuminated mirror including a lamp, said mirror including the lamp being located within said casing and removable through said opening, said casing having a straight substantially horizontal portion adjacent said opening to support said mirror in a substantially horizontal position and having an enlarged portion toward the rear of said casing, a rewinding drum located within the enlarged portion of said casing having an extension conductor connected to said lamp, and a switch within said casing automatically operable to close the lamp circuit when the mirror is removed a distance from said casing into normal vision.

5. An accessory for automobiles comprising a casing located out of normal vision, said casing being disposed substantially horizontally but slightly downwardly inclined and having an opening therein toward the interior of the automobile, an electrically illuminated mirror including a lamp, said mirror including the lamp being located within said casing and removable through said opening, said casing having a straight substantially horizontal portion adjacent said opening with a longitudinal groove therealong and having a rear portion adapted to enclose a rewinding drum, an extension conductor connected to said drum and said mirror and adapted to be guided by said groove, a rewinding drum located within said rear portion and mounted on a vertically inclined axis, the construction and arrangement being such that the line of movement of said extension conductor is substantially in line with the plane of winding of said drum.

CHRISTIAN GIRL.
WAYNE E. DUNSTON.